March 21, 1967  R. J. KEYNTON  3,310,258
TECHNIQUE FOR CONTROL OF FREE-FLIGHT ROCKET VEHICLES
Filed Aug. 31, 1964

INVENTOR
ROBERT J. KEYNTON

INVENTOR
ROBERT J. KEYNTON

BY
William H. King
ATTORNEYS

March 21, 1967 R. J. KEYNTON 3,310,258
TECHNIQUE FOR CONTROL OF FREE-FLIGHT ROCKET VEHICLES
Filed Aug. 31, 1964 6 Sheets-Sheet 6

INVENTOR
ROBERT J. KEYNTON

BY
ATTORNEYS

United States Patent Office 3,310,258
Patented Mar. 21, 1967

3,310,258
TECHNIQUE FOR CONTROL OF FREE-FLIGHT ROCKET VEHICLES
Robert J. Keynton, Hampton, Va., assignor to the United States of America as represented by the Administrator of the National Aeronautics and Space Administration
Filed Aug. 31, 1964, Ser. No. 393,461
10 Claims. (Cl. 244—3.14)

The invention described herein may be manufactured and used by or for the Government of the United States of America for governmental purposes without the payment of any royalties thereon or therefor.

The present invention relates generally to unguided rocket vehicles and more specifically to a method and apparatus for controlling the trajectories of multistage unguided rocket vehicles.

In the past, methods for trajectory control of unguided rocket vehicles have been very crude and often rather inaccurate. Usually an effort is made to fly the vehicle along the desired trajectory by firing the rocket with launcher settings that will, hopefully, account for wind dispersion effects and by using preset times for sequencing events such as upper stage ignition times. Through use of skillfully prepared wind effect charts to determine launcher settings and through careful control of other trajectory disturbing items (such as alignment of rocket motor nozzles to reduce dispersion from thrust alignment), vehicles go about where one wants them to go most of the time. However, for many missions this type of control is hopelessly inadequate.

On a few unguided rocket fllights, trajectory control was achieved by observing the trajectory of the vehicle as determined by tracking radar and displayed on a radar plot board. The upper stage of the vehicle would then be fired at a point where the display indicated that the remainder of the trajectory would be that desired for the mission at hand. The items displayed and the methods for using the displayed information, however, were relatively crude and inaccurate and only slightly better than the method discussed in the preceding paragraph.

The primary purpose of this invention is to provide a new technique for trajectory control of unguided rocket vehicles that is more accurate than prior techniques. This new technique will be described as being used to control the trajectory of a three-stage vehicle. However, its use is not restricted to three-stage vehicles as it can be used on any rocket vehicle having more than one stage.

An abridged sequence of events for a three-stage rocket vehicle consists of ground ignition of the first stage, first stage burnout, coast time after first stage burnout, ground command-firing of the second stage, third stage ignition by a pressure switch mounted on the second stage, and third stage burnout. The success of a mission of such a three-stage rocket vehicle can be measured in terms of the difference between the actual and desired altitudes of the vehicle at third stage burnout. That is, if the actual altitude of the vehicle at third stage burnout is near the desired altitude, then the mission is a success.

The present invention consists of selecting a coast time after first stage burnout such that third stage burnout will occur at a desired altitude. By an appropriate selection of this coast time the trajectory deviations caused by wind effects, thrust misalignment before spinup, launcher tip-off and variations from nominal of the motor thrust and vehicle drag can be compensated for.

The present invention determines, while the vehicle is in flight, the first stage coast time necessary to compensate for various trajectory deviations that may occur during first stage operation. In making this determination a nominal flight path of the vehicle is determined prior to flight. This nominal flight path includes a coast time after first stage burnout. If the actual flight path deviates from the nominal flight path during first stage operations the deviation is compensated for by either increasng or decreasing the coast time after first stage burnout. As an example, if there were tipup at liftoff of the rocket vehicle the effective launch angle of the vehicle would be increased. This would cause a deviation from the nominal flight path. If the nominal first stage coast time is not changed then third stage burnout would occur at a higher altitude than the desired altitude. However, if the first stage coast time is increased the second stage ignition flight path angle and velocity are varied which results in a lower altitude at third stage burnout. Consequently, if the coast time is increased the right amount then the third stage will burnout at the desired altitude. Following this line of reasoning, this invention consists of preparing a family of curves of time rate of change of altitude versus time rate of change of range and flight path angle versus altitude for display on radar plot boards. These plots form grids by which the decision is made to ignite the second stage so that the third stage will burnout at the desired altitude.

It is, therefore, an object of this invention to provide a method and means for controlling the trajectory of unguided multistage rocket vehicles.

Another object of this invention is to provide a method and means for determining, while a multistage rocket is in flight, the first stage coast time required to cause the vehicle to acquire a desired altitude.

A further object of this invention is to provide a method and means for controlling the trajectory of an unguided rocket vehicle by making inflight trajectory changes to compensate for trajectory deviations.

A still further object of this invention is to provide a method and means for determining the length of coast time after the first stage burnout of a multistage rocket vehicle necessary to cause the last stage of the vehicle to burnout at a desired altitude.

Other objects and advantages of this invention will further become apparent hereinafter and in the drawings, in which.

In describing this invention specific terminology will be resorted to for the sake of clarity. However, it is not intended to be limited to the specific terms so selected, and it is to be understood that each specific term includes all technical equivalents which operate in a similar manner to accomplish a similar purpose.

The major causes of trajectory deviations of a multistage rocket vehicle occur during first stage operation. These trajectory deviations may be divided into two groups: those which may be duplicated by launch angle variations and those which may be duplicated by velocity variations. If these trajectory deviations are compensated for, then the last stage of the vehicle will burn out at approximately the desired altitude.

The trajectory deviations that may be duplicated by launch angle variations are caused by unavoidable wind effects, thrust misalignment, and launcher tipoff. Consequently, it can be seen that these deviations can be simulated by an effective initial launch angle $((a)_{eo})$. It then follows that there are certain combinations of effective initial launch angle, flight path angle at second stage ignition $((a)_{2i})$, velocity at second stage ignition $(V_{2i})$, and altitude at second stage ignition $(Z_{2i})$ which will result in a desired altitude at last or third stage burnout $(Z_{3BO})$. It will be assumed for purposes of explanation that the desired altitude at third stage burnout is 180,000 feet.

Figure 1:
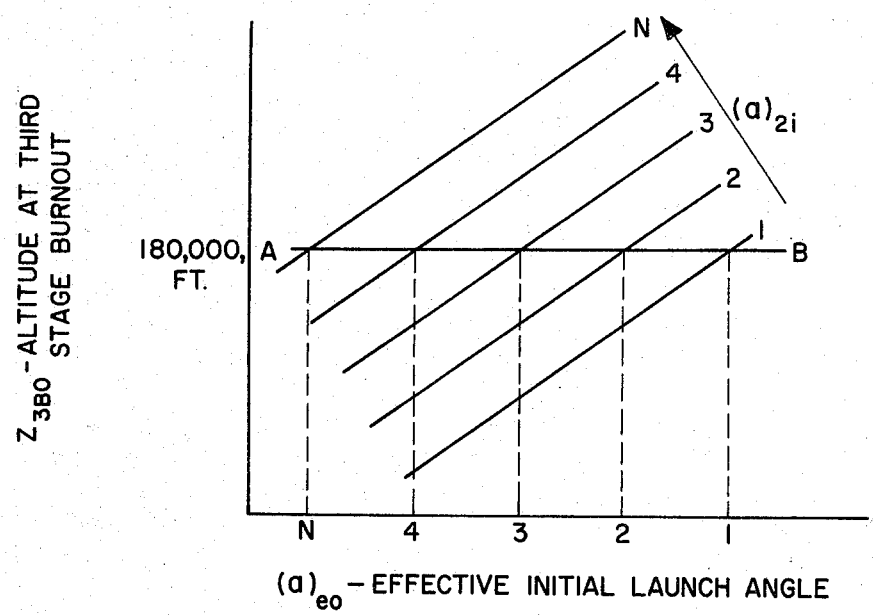
FIG. 1 is a graph of effective initial launch angle versus altitude at third stage burnout for a range of several values of flight path angle at second stage ignition.

A general purpose electronic computer is programmed to simulate flights of the three-stage rocket vehicle that is to be controlled. Then arbitrary values of $(a)_{eo}$ and $(a)_{2i}$ are chosen and inserted into the computer to simulate particular flights. From the data derived from the computer the graphs in FIGS. 1 and 2 can be plotted. The graph in FIG. 1 is plotted by selecting a $(a)_{2i(1)}$ and a $(a)_{eo}$ to put into the computer to compute a $Z_{3BO}$. Then the same $(a)_{2i(1)}$ and another $(a)_{eo}$ is put into computer to compute another $Z_{3BO}$. This process is repeated for several $(a)_{eo}$. A plot of each of the $(a)_{eo}$ selected against each of the $Z_{3BO}$ computed for $(a)_{2i(1)}$ results in curve (1) in FIG. 1. The process is then repeated $(N-1)$ times to obtain curves (2) through (N) in FIG. 1. A line AB is drawn at a $Z_{3BO}$ of 180,000 feet parallel to the $(a)_{eo}$ axis. This line AB intersects all curves $(a)_{2i}$. Each of these intersections defines a combination of $(a)_{eo}$ and $(a)_{2i}$ that will result in a $Z_{3BO}$ of 180,000 feet.

Figure 2:
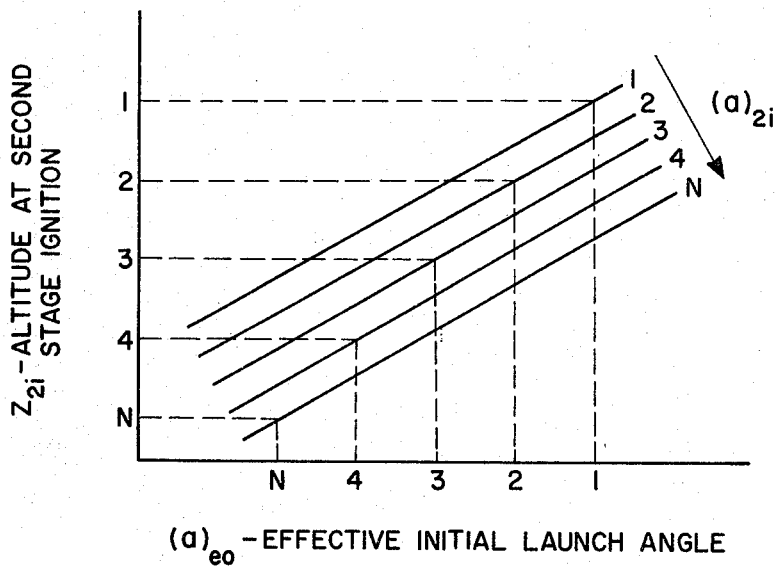
FIG. 2 is a graph of effective initial launch angle versus altitude at second stage ignition for a range of several values of flight path angle at second stage ignition.

In addition to computing $Z_{3BO}$ the computer also computes $Z_{2i}$. Consequently the graph in FIG. 2 can be plotted in the same manner as the graph in FIG. 1. The $(a)_{eo}$ in FIG. 1 that result in a $Z_{3BO}$ of 180,000 feet are projected onto the corresponding $(a)_{2i}$ curves then to the $Z_{2i}$ axis. FIG. 2 then gives the combinations of $(a)_{eo}$, $(a)_{2i}$ and $Z_{2i}$ that will result in a $Z_{3BO}$ of 180,000 feet.

Figure 3:
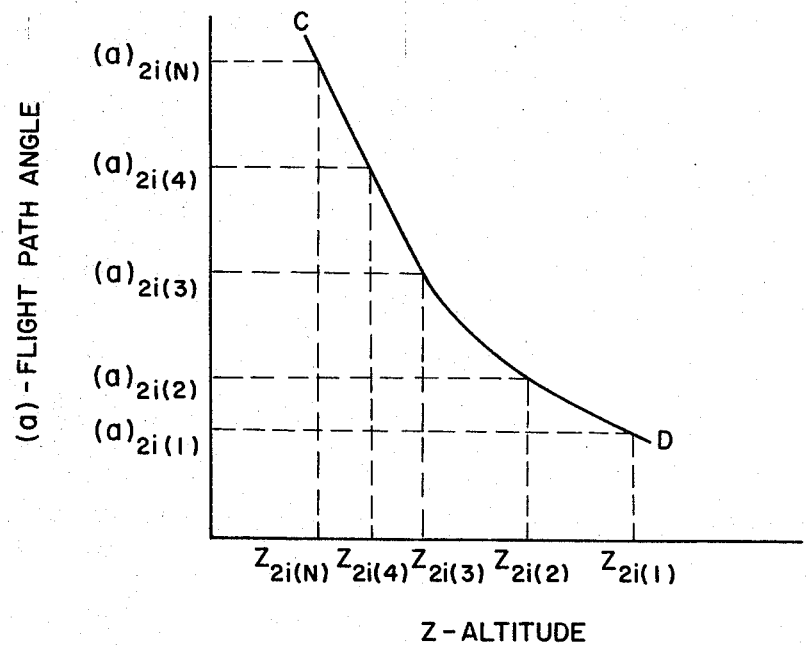
FIG. 3 is a graph of altitude of the vehicle versus flight path angle of the vehicle.

FIG. 3 is a cross plot of the $Z_{2i}$ versus the $(a)_{2i}$ values in FIG. 2. That is, $Z_{2i(1)}$ and $(a)_{2i(1)}$ determines one point on the plot, $Z_{2i(2)}$ and $(a)_{2i(2)}$ determines a second point on the plot, etc. All of these points are connected together to form a curve C-D. Curve C-D represents a locus of points at which to ignite the second stage so that third stage burnout occurs at an altitude of 180,000 feet. Therefore, if the trajectory deviations were confined to those that can be simulated by initial launch angle they can be compensated for as follows. The curve C-D is displayed on a radar plot board that provides a trace of flight path angle $(a)$ versus altitude $(Z)$. When this trace crosses curve C-D the second stage is ignited; thus, compensating for any first stage trajectory deviations due to wind effects, thrust misalignment, and launcher tipoff.

The trajectory deviations that may be duplicated by velocity variations are caused by variations in predicted thrust or inaccuracies in the method for computing drag. The effect of these errors becomes evident in the velocity of the vehicle and are also reflected in the altitude and flight path angle plots, which in turn determine end conditions. As an example, if the velocity were high at first stage burnout, then it would be necessary to coast for a longer period of time not only to dissipate the added velocity but also to lower the flight path angle which would be high at first stage burnout, as a result of the added velocity.

Figure 4:
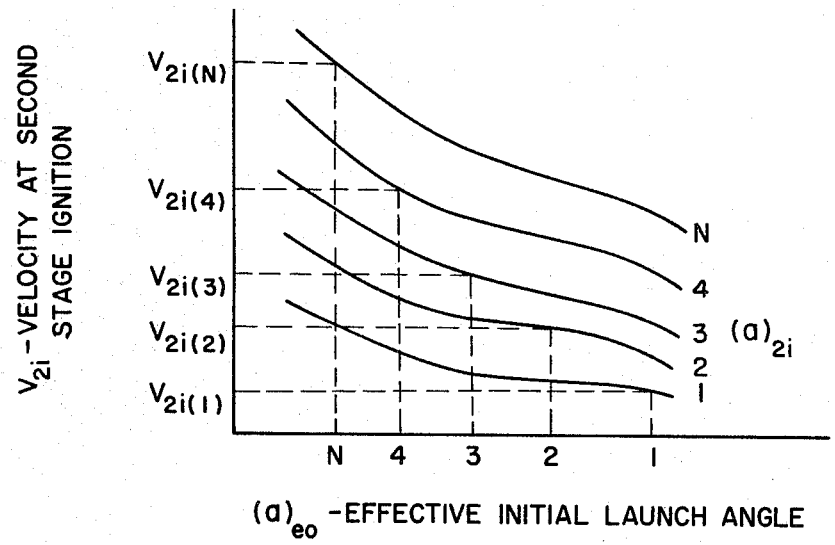
FIG. 4 is a graph of effective initial launch angle versus velocity at second stage ignition for a range of several values of flight path angle at second stage ignition.
Figure 5:
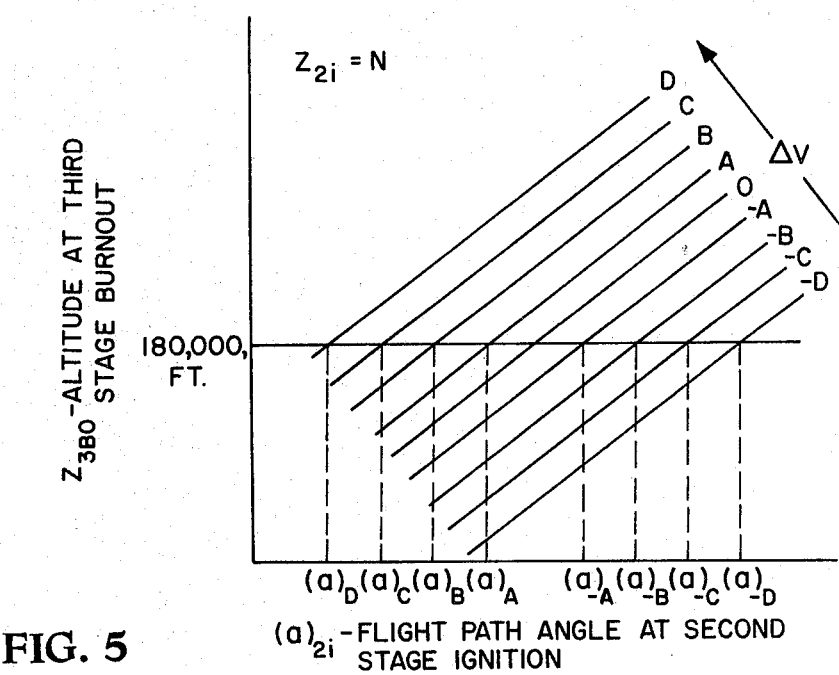
FIG. 5 is a graph of flight path angle at second stage ignition versus altitude at third stage burnout for a range of several values of velocity and for a given altitude at second stage ignition.
Figure 6:
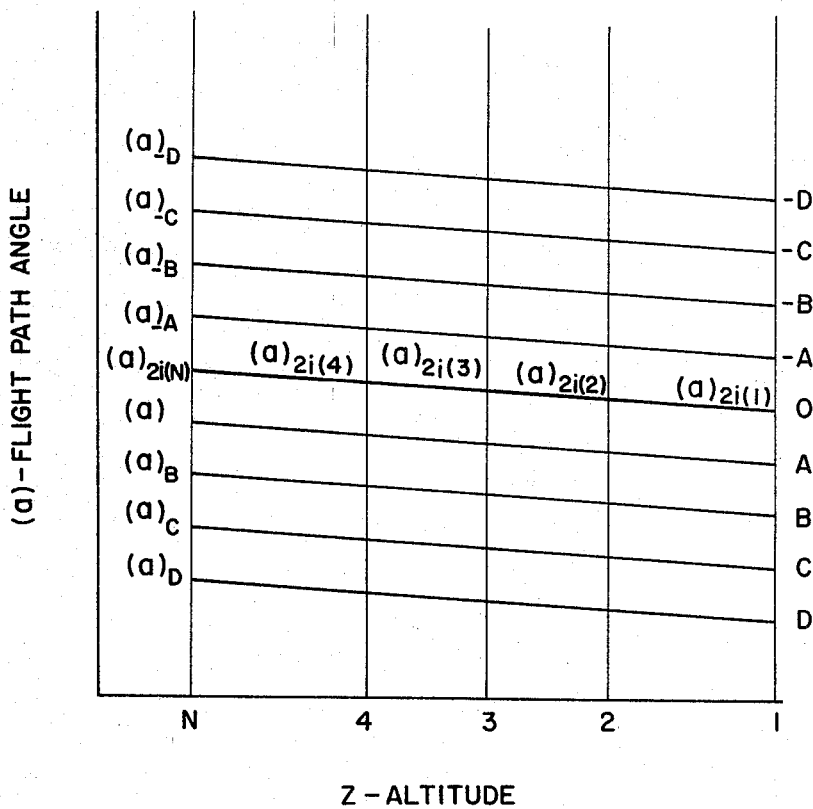
FIG. 6 is a graph containing the information in FIG. 5 for a range of several values of altitude at second stage ignition.

When the vehicle experiences a velocity error, the flight path angle and altitude at second stage ignition required to achieve the desired altitude at third stage burnout is determined in the following manner. FIG. 4 which is a plot of $(a)_{eo}$ versus $V_{2i}$ is made in the same manner as FIGS. 1 and 2. Then the (1) and (N) values of $(a)_{eo}$ are projected onto the curves $(a)_{2i}$ and then onto the $V_{2i}$ axis. The values thus determined are the absolute values of $V_{2i}$ which in combination with the corresponding values of $(a)_{2i}$ and $Z_{2i}$ will cause third stage burnout to happen at 180,000 feet, if there are no velocity deviations during first stage operation. To determine the effect of velocity variations it is necessary to make a further study with the electronic computer. The altitude at second stage ignition $Z_{2i}$ is held constant at say $Z_{2i(n)}$, and $V_{2i}$ and $(a)_{2i}$ are varied so that a plot as shown in FIG. 5 is obtained. FIG. 5 is a plot of $(a)_{2i}$ versus $Z_{3BO}$ for several values of $V_{2i}$ at a given $Z_{2i}$. First the $V_{2i(N)}$ determined from FIG. 4 and its associated $Z_{2i}$ as determined from FIG. 2 are inserted into the computer and $(a)_{2i}$ is varied. From this data the computer computes values of $Z_{3BO}$. This provides the data to plot the 0 curve. Then the process is repeated by changing $V_{2i}$ in increments of A, B, C and D on both sides of $V_{2i(N)}$. This results in all the other curves in FIG. 5. Other plots as in FIG. 5 are made for $Z_{2i(1)}$, $Z_{2i(2)}$, $Z_{2i(3)}$, and $Z_{2i(4)}$. Then these plots are put on one graph in FIG. 6. FIG. 6 is a graph of $Z_{2i}$ versus $(a)_{2i}$. The curve defined by points $(a)_{2i(1)}$ through $(a)_{2i(N)}$ represents the locus of points at which the second stage should be ignited to achieve a $Z_{3BO}$ of 180,000 feet when there is no deviation in velocity during first stage operation. This curve is the same as curve C-D in FIG. 3. When there are velocity deviations during first stage operation curves $(a)_{2i(-D)}$ through $(a)_{2i(D)}$ represent the loci of points at which the second stage should be ignited to compensate for these deviations. FIG. 6, therefore, represents a typical plot board grid upon which the final decision is made to ignite the second stage.

Figure 7:
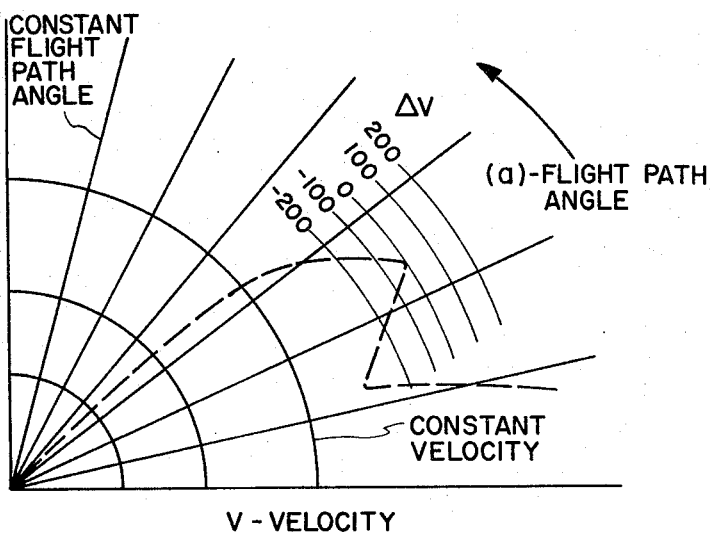
FIG. 7 is a typical velocity-flight path angle plot for two stages of a multistage rocket vehicle.

If FIG. 6 were displayed on a radar plot board that provides a trace of flight path angle $(a)$ versus altitude $(Z)$, the command for second stage ignition can be given when the trace crosses one of the curves. The particular curve can be determined from a graph shown in FIG. 7. FIG. 7 is a typical polar coordinate velocity versus flight path angle plot for two stages of a multistage vehicle. The concentric arcs represent lines of constant velocity and the rays from the origin represent lines of constant flight path angle. The dashed curve is a plot of the nominal flight path for two stages of a multistage vehicle. The $\Delta V$ grid is a family of curves that is used to determined the velocity deviations of the vehicle during first stage operation. The zero curve is plotted from data obtained from the general purpose electronic computer mentioned above. That is, maximum velocity is obtained for several $(a)_{eo}$ settings to obtain the zero curve. Then several parallel curves are drawn on each side of the zero curve to obtain the $\Delta V$ grid. It should be noted that the $\Delta V$ grid is not concentric about the origin.

Figure 8:
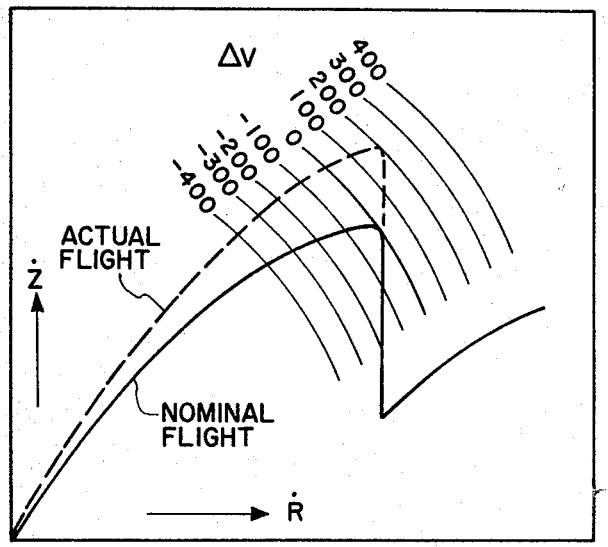
FIG. 8 is the top view of the first radar plot board used by this invention.
Figure 9:
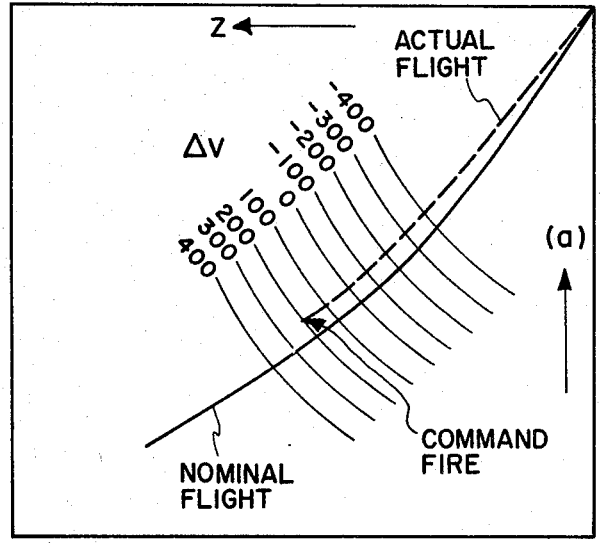
FIG. 9 is a top view of a second radar plot board used by this invention.

FIGS. 8 and 9 show top views of the two radar plot boards used to make the decision as to when to ignite the second stage. Also shown by these figures is a sample of an actual flight. FIG. 8 shows plots of the time rate of change of range $(\dot{R})$ versus the time rate of change of altitude $(\dot{Z})$. This turns out to be the same plot as that shown in FIG. 7 of V versus $(a)$ in polar coordinates. FIG. 9 shows plots of altitude versus flight path angle. The solid lines in FIGS. 8 and 9 are plots of a nominal flight of the rocket vehicle under consideration. As can be seen in FIG. 8 the first stage burns out at a $\Delta V$ equal to zero. This means that there is no trajectory deviation due to velocity error. Therefore, for a nominal flight the operator would command fire when the nominal flight curve in FIG. 9 crosses the ΔV equal zero line. The ΔV equal zero line in FIG. 9 is the same as the $(a)_{21(N)}$ through $(a)_{21(1)}$ line in FIG. 6. The other ΔV lines —400 through 400 are equivalent to the $(a)_{-D}$ through $(a)_D$ lines in FIG. 6.

The dashed lines in FIGS. 8 and 9 are plots of an actual flight. As can be seen in FIG. 8, the maximum velocity of the actual flight is 200 feet per second high. That means that the command to fire is not given until the actual flight pot in FIG. 9 crosses the 200 feet per second curve on the ΔV grid. Then all trajectory deviations during operation of the first stage are compensated for.

Figure 10:
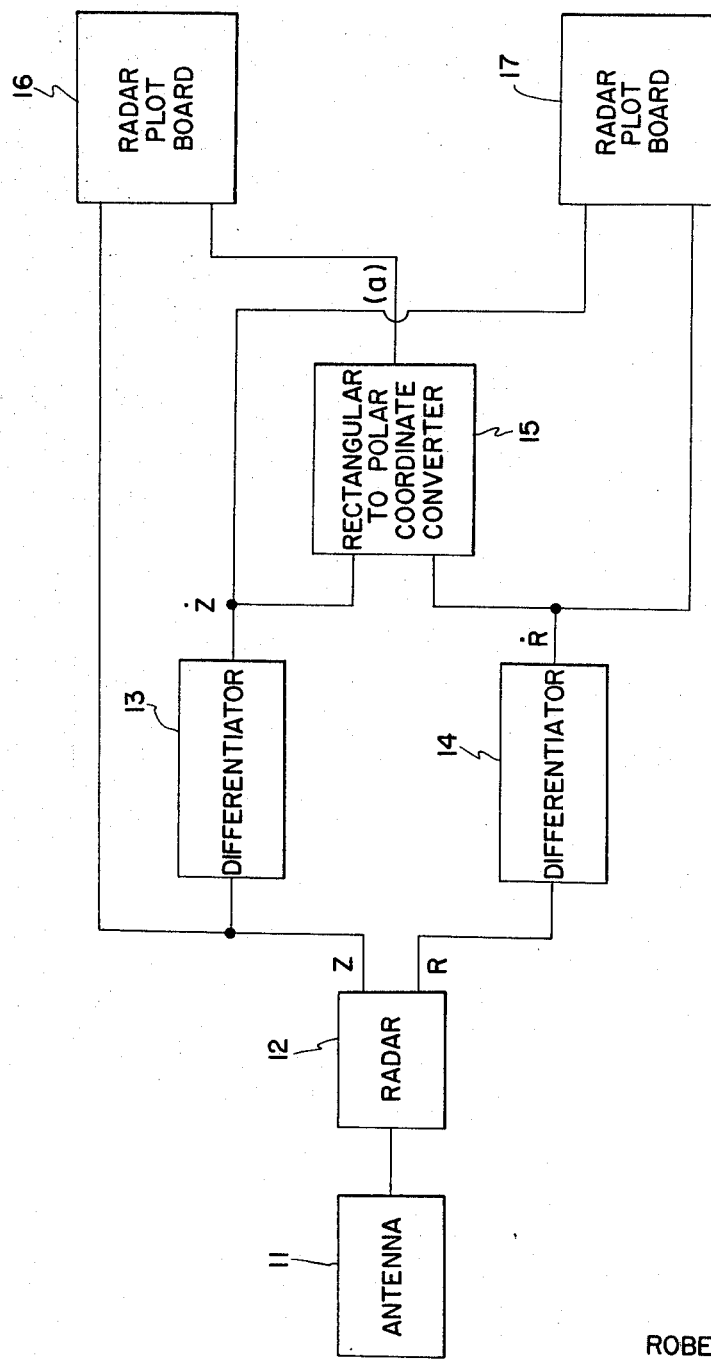
FIG. 10 is a block diagram of the apparatus used by this invention.

Referring now to FIG. 10 there is shown the apparatus necessary to utilize the trajectory control technique outlined above. The antenna 11 and radar 12 track the rocket vehicle and produce two electrical signals that are proportional to the altitude (Z) and range (R) of the vehicle. The signals are differentiated with respect to time by analog differentiators 13 and 14 to produce electrical signals Ż and Ṙ, respectively. The signals Ż and Ṙ are applied to a rectangular-to-polar coordinate converter 15. Converter 15 produces an electrical output signal proportional to $$\tan^{-1} \frac{\dot{Z}}{\dot{R}}$$

which is equal to the rocket vehicle's flight path angle $(a)$. The signals Z and $(a)$ are applied to a radar plot board 16, and the signals Ż and Ṙ are applied to a radar plot board 17. Even though two radar plot boards 16 and 17 are disclosed in practicing the invention only one need be used. All information can be displayed on one radar plot board having dual arms. Antennas, radars, differentiators, rectangular-to-polar coordinate converters and radar plot boards are well known and will, therefore, not be described in detail in this specification.

During operation antenna 11 and radar 12 will track the rocket vehicle. The resulting computed values of Z and $(a)$ are applied to radar plot board 16 and the resulting computed values of Ż and Ṙ are applied to radar plot board 17. Radar plot board 17 has the nominal flight line and ΔV grid of FIG. 8 displayed on it, and radar plot board 16 has the nominal flight line and ΔV grid in FIG. 9 displayed on it. The operator notes at which ΔV curve on radar plot board 17 the flight attains a maximum velocity and then he ignites the second stage at the instant that the plot board pen crosses the corresponding ΔV curve on radar plot board 16.

The advantage of this invention over the prior art is that is is more dependable since it eliminates most of the guesswork. Instead of trying to guess what the trajecory deviations will be prior to flight this invention provides a method and apparatus for determining the extent of the trajectory deviations as they actually happen.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Equipment other than differentiators 13 and 14, and rectangular-to-polar coordinate converter 15 could be used to compute Z, Ż, Ṙ, and $(a)$ without departing from the spirit or scope of this invention.

What is claimed is:

1. Apparatus for controlling the trajectory of a multistage rocket vehicle comprising: means for generating a first signal proportional to the altitude of said vehicle, a second signal proportional to the flight path angle of said vehicle, a third signal proportional to the time rate of change of the altitude of said vehicle and a fourth signal proportional to the time rate of change of the range of said vehicle; a first radar plot board with a velocity grid of said vehicle permanently displayed thereon connected to receive said first and second signals to display the actual flight path of said vehicle on an altitude versus flight path angle plot; and a second radar plot board with a velocity grid of said vehicle permanently displayed thereon connected to receive said third and fourth signals to display the actual flight path of said vehicle on a time rate of change of altitude versus time rate of change of range plot whereby if a flight control operator notes the velocity curve on the second radar plot board at which said actual flight reaches a maximum velocity and he ignites the second stage of the vehicle when the actual flight crosses the corresponding velocity curve on the first radar plot board all trajectory deviations occurring during first stage operation will be compensated for.

2. Apparatus in according with claim 1 wherein said means for generating said first, second, third, and fourth signals includes an antenna and radar.

3. Apparatus in accordance with claim 1 wherein said velocity grid displayed on said second radar plot board consists of a zero curve which represents the velocity of said vehicle at first stage maximum velocity if there are no velocity variations in the first stage of operation and several parallel curves on each side of said zero curve.

4. Apparatus in accordance with claim 3 wherein said velocity grid displayed on said first radar plot board is correlated with the velocity grid displayed on said second radar plot board.

5. Apparatus in accordance with claim 1 wherein said velocity grid displayed on said first radar plot board consists of a first curve representing a locus of points at which to ignite the second stage of said vehicle so that the last stage will burn out at the desired altitude if there are no velocity variations in the operation of the first stage and several parallel curves on each side of said first curve.

6. Apparatus in accordance with claim 5 wherein said velocity grid displayed on said second radar plot board is correlated with the velocity grid displayed on said first radar plot board.

7. Apparatus for controlling the trajectory of a multistage rocket vehicle comprising: means for tracking said vehicle and for producing a first signal proportional to the altitude of said vehicle and a second signal proportional to the range of said vehicle; means receiving said first and second signals for producing a third signal proportional to the time rate of change of altitude, a fourth signal proportional to the time rate of change of range and a fifth signal proportional to the flight path angle of said vehicle; a first radar plot board with a velocity grid of said vehicle permanently displayed thereon connected to receive said first and fifth signals to display the actual flight path of said vehicle on an altitude versus flight path angle plot; and a second radar plot board, with a velocity grid of said vehicle permanently displayed thereon, connected to receive said third and fourth signals to display the actual flight path of said vehicle on a time rate of change of altitude versus time rate of change of range plot whereby if a flight control operator notes the velocity curve on the second radar plot board at which said actual flight reaches a maximum velocity and he ignites a subsequent stage of the vehicle when the actual flight crosses the corresponding curve on the first radar plot board all trajectory deviations occuring during the prior stages of operation will be compensated for.

8. Apparatus in accordance with claim 7 wherein said velocity grid displayed on said second radar plot board consists of a zero curve which represents the velocity of said vehicle at first stage maximum velocity if there are no velocity variations in the prior stages of operation and several parallel curves on both sides of the zero curve.

9. Apparatus in accordance with claim 8 wherein said velocity grid displayed on said first radar plot board is correlated with the velocity grid displayed on said second radar plot board.

10. Apparatus for controlling the trajectory of a multi-stage rocket vehicle comprising: means for generating a first signal proportional to the altitude of said vehicle and a second signal proportional to the flight path angle of said vehicle; a radar plot board connected to receive said first and second signals to display the actual flight path of said vehicle on an altitude versus flight path angle plot; a curve, representing a locus of points at which to ignite the second stage of said vehicle so that the last stage will burn out at the desired altitude, permanently displayed on said radar plot board whereby if the second stage of said vehicle is ignited when said displayed actual flight crosses said curve the last stage of said vehicle will burn out at the desired altitude.

References Cited by the Examiner

UNITED STATES PATENTS

| 2,405,231 | 8/1946 | Newhouse | 343—5 |
|---|---|---|---|
| 3,008,668 | 11/1961 | Darlington | 244—14 |
| 3,073,550 | 1/1963 | Young | 244—14 |
| 3,179,355 | 4/1965 | Pickering et al. | 244—14 |
| 3,188,958 | 6/1965 | Burke et al. | 244—14 |

References Cited by the Applicant

UNITED STATES PATENTS

| 2,520,433 | 8/1950 | Robinson. |
|---|---|---|
| 2,932,467 | 4/1960 | Scorgie. |
| 2,943,822 | 7/1960 | Hamilton. |
| 3,015,457 | 1/1962 | Dixson. |

BENJAMIN A. BORCHELT, *Primary Examiner.*

W. C. ROCH, *Assistant Examiner.*